United States Patent [19]
Ennis

[11] Patent Number: 5,470,101
[45] Date of Patent: Nov. 28, 1995

[54] DRIVER SIDE AIR BAG MODULE

[75] Inventor: Thomas A. Ennis, Clinton Twp., Mich.

[73] Assignee: AlliedSignal Inc., Morristown, N.J.

[21] Appl. No.: 169,907

[22] Filed: Dec. 20, 1993

[51] Int. Cl.$^6$ .................................................. B60R 21/16
[52] U.S. Cl. ................................ 280/728.2; 280/728.3;
280/731; 403/282; 403/316; 403/381
[58] Field of Search .................................. 280/731, 732,
280/728 R, 728 A, 728 B; 403/316, 282,
374, 394, 381

[56] References Cited

U.S. PATENT DOCUMENTS

| 3,090,086 | 5/1963 | Fata | 403/381 |
| 4,531,578 | 7/1985 | Stay et al. | 403/284 |
| 5,201,541 | 4/1993 | Jones et al. | 280/728 A |

FOREIGN PATENT DOCUMENTS

| 1160756 | 6/1989 | Japan | 280/728 A |
| 4169356 | 6/1992 | Japan | 280/728 A |
| 5-38994 | 2/1993 | Japan | 280/728 B |

Primary Examiner—Eric D. Culbreth
Attorney, Agent, or Firm—Markell Seitzman

[57] ABSTRACT

An air bag module (20) having a base plate (24), with opposingly situated open sided, channels (50a,b), each channel having at least one open end (61). The module includes a cover (100) for protecting an air bag (150) folded upon the base plate. The cover includes a top (102) and sides wall (106a,b), each side wall includes outwardly extending flanges or shoulders (114a,b) slidably receivable within the open end of each channel (50a,b).

6 Claims, 1 Drawing Sheet

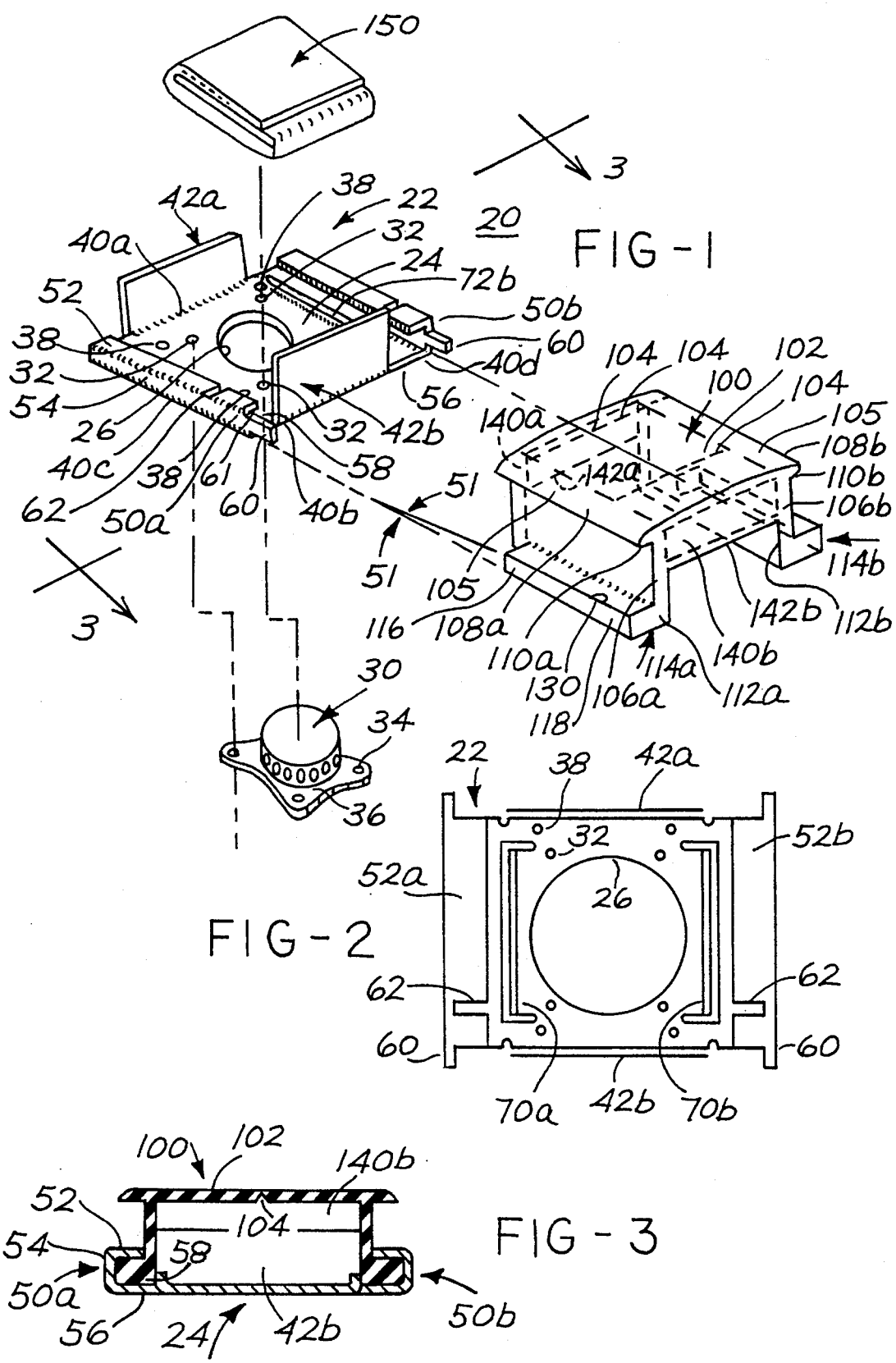

DRIVER SIDE AIR BAG MODULE

BACKGROUND AND SUMMARY OF INVENTION

The present invention relates to a driver side module for the passenger side of a vehicle.

Passenger side air bag modules are typically fastened to a steering wheel of a vehicle. Typically an air bag module comprises a housing in which is mounted an inflator or gas generator. An air bag is mounted to the housing or gas generator in a manner to receive inflation gas provided by the inflator. A cover is mounted to the housing to protect the air bag. Typically covers for the driver side module include one or more tear seams which are opened by the air bag as it inflates.

Typical of the prior are is that the housing and cover are mounted together by a number of individual parts such as fasteners, retainer strips, clips, rivets and screws which increase the cost of the module, due to the added labor needed during assembly, and further increases the time needed to assemble the module.

It is the object of the present invention to provide an improved driver side module and one in which the covers slid within and is retained by a housing or mounting plate without the need of separate fastening devices. As will be seen from the description, below the present invention eliminates the use of individual fasteners to attach a cover, reduces the assembly time and the overall cost of the unit. In addition, the cover can be easily disattached from its base, housing or mounting plate which provides for easier field service in repairing or replacing one or more parts of the module.

Accordingly, the invention comprises: an air bag module comprising: a base plate, having first means for securing an air bag inflator thereto and opposingly situated open sided, channels, each channel having at least one open end; and a cover means protecting an air bag. The covers means includes a top and side walls, each side wall includes locating means, such as flanges, slidably receivable within the open end of each channel. Tabs may be provided to prohibit the cover from sliding out of the channels. The flanges and channels may be tapered and closely (interference) fitted together.

Many other objects and purposes of the invention will be clear from the following detailed description of the drawings.

BRIEF DESCRIPTION OF THE DRAWINGS

In the drawings:

FIG. 1 illustrates an assembly view showing the major components of the present invention.

FIG. 2 shows a top view of a mounting plate or bracket.

FIG. 3 illustrates a cross-sectional view taken through section lines 3—3 of FIG. 1.

DETAILED DESCRIPTION OF THE INVENTION

With reference to FIG. 1 there is shown a driver side air bag module 20. The module comprises a mounting plate assembly 22 comprising a base plate 24, a gas generator or inflator 30, and an air bag 150. The base plate 24, includes a central opening 26 through which the inflator 30, of known design, is received. Positioned about the central opening 26 are a plurality of smaller mounting holes 32 which are aligned with a corresponding number of holes 34 in a flange 36 of the inflator 30. A plurality of fasteners (not shown) received through openings 32 and 24 are used to mate the inflator 30 to the base plate 24. The base plate may optionally include a second plurality of openings such as 38 that may be used to mount the base plate 24 to a steering wheel. Alternatively, the fasteners which attach the inflator to the base plate can also be used to attach the mounting bracket 34 to the steering wheel.

The base plate 24 may be fabricated from a metal stamping. The base plate generally has four sides 40a–d. Extending integrally from the base plate is a first side plate 42a. The first side plate extends upwardly from the first side. 40a. Extending up from an opposite side of the base plate proximate the second side 40b is a second side plate 42b. Parts of the base plate 24 proximate the third and fourth sides 40c,d are bent forming two symmetrical shaped channels 50 and 50b. A first of these channels 50a comprises a top 52 side 54 and bottom 56 formed from the material of the base plate 24. As can be seen from FIG. 3, the cross section of the channel of 50a is generally U-shaped. As can be appreciated, this channel can be circularly or otherwise shaped. The remaining side such as 58 of the channel is opened across the length of the channel. A first tab 60 extends from one end 61 of the channel 50a. In the preferred embodiment of the invention, the channel 50a is tapered, or angled (see arrows 51 representative of such angle), that is, it has a varying height between its top 52 and bottom 56. As can be seen from FIG. 1, the channel 50a tapers outwardly, i.e., with increasing height, generally from the first side 40a to the second side 40b of the base plate 24. Formed on the top 52 of the channel is a first retainer feature 62. This retainer feature may include a slot or preferably downwardly extending dimple. As will be seen from the description below, this retainer feature 62 lockingly engages with another retaining feature 130 formed on the cover 100.

The base plate includes a second integrally formed channel 50b. This channel is of identical structure to channel 50a having a top, side and bottom 52,54,and 56 respectively and also having a open side 58 that inwardly faces and is oppositely positioned relative to the first channel 50a. Reference is briefly made to FIG. 2. As can be seen the base plate 24 includes a plurality of up standing, bent over sections of material or tabs. Tab 70a provides a means of preventing the flange 114a from moving inwardly from of channel 50a. Similarly, tab 70b prevents flange 114b from moving inwardly.

With regard to the cover 100, it is preferably of a vinyl or urethane plastic having a relatively hard durometer value or rating. The cover may be fabricated as a one piece molded product. Integrally formed in the top 102 of the cover 100, are a plurality of tear seams 104 and related hinge portions 105 about which parts of the covers rotate after the tear seams are opened or broken. Such tear seams are known in the art. The cover additionally includes first and second side walls 106a and 106b extending down from the top 102.

These side walls 106a,b may be positioned inward of sides 108a and 108b of the top 102 forming flanges 110a and 110b. At or near the bottoms 112a and 112b of each side wall 106a and 106b are respective outwardly extending flanges 114a and 114b. As can be seen, each flange 114a and 114b is tapered from its end 116 to another end 118. Each flange 114a and 114b includes the second retainer feature 130 which lockingly engages the first retainer feature 62 formed on each channel 50a and 50b. The second retainer feature may include an up raise portion of material engageable with a slot formed on the top 52 of a channel or alternatively may comprise a groove into which the dimple of the first retainer feature 62 fits. The cover 100 further includes first and second end walls 140a and 140b, partially extending down from the top 102 and coplaner with respective ends of each of the side walls 106a and 106b. The end walls 140a and 140b in cooperation with the side walls 106a,b form respective end openings 142a and 142b.

During assembly the air bag 150, shown as folded package in FIG. 1, is mounted to the base plate in a known manner with the mounting fasteners securing the air bag 150 and inflator 30 to the base plate 24. Typically driver side air bags include a central opening. Positioned interior of the central opening is a ring. The ring and central opening include a plurality of fastener openings to receive the fasteners which mount the inflator, and ring to the base plate. As such, these fasteners clamp the air bag, proximate its opening to the base plate while simultaneously mounting and securing the inflator thereto. With the inflator and/or air bag in position, the cover 100 is positioned with the shorter end of each flange 114a,b adjacent the channels 50a and 50b and the up raised tabs 70a and 70b. The opening 142a is positioned adjacent the side wall 42b. Thereafter, the cover is slid upon the base plate 24. As the cover is slid upon the base plate, the tapered flanges 114a,b enter the tapered channels 50a,b. The flanges 114a,b are sized to provide for an interference fit with its corresponding channel 50a or 50b. With the cover in place in the channel, the first and second retainer features 62 and 130 respectively, formed on each top 52 of each channel and formed on the top of each flange 114a,b lockingly engaged one another. Thereafter, the tabs 60 extending from each channel may are bent over latching the end 118 of each flange 114a,b in place. In this position, the side wall 106a fits generally within opening 142a and side wall 42b fits generally within opening 142b.

If disassembly is required, the tabs 60 are straightened and the cover 100, inflator 30 or air bag 150 removed.

Many changes and modifications in the above described embodiment of the invention can, of course, be carried out without departing from the scope thereof. Accordingly, that scope is intended to be limited only by the scope of the appended claims.

I claim:

1. An air bag module (10) comprising:

a base plate (24), having first means for securing an air bag inflator thereto and opposingly situated open sided, tapered channels (50a,b), generally extending across most of an adjacent side of the base plate, each channel having at least one open end (61);

a cover means (100) for protecting an air bag (150), the cover means includes a top (102) and side walls (106a, b), each side wall includes tapered locating means (114a,b) slidably receivable within the open end of and into each channel (50a,b), wherein the base plate, proximate the open end of each channel includes a first fold over tab means (60) for prohibiting the cover means from sliding out of the channels and when folded back permitting the cover to be removed.

2. The device as defined in claim 1 wherein the cover means includes a plurality of tear seams (102) and hinges (105) about which portions of the top can rotate upon opening of the tear seams.

3. An air bag module (10) comprising:

a base plate (24), having first means for securing an air bag inflator thereto and opposingly situated open sided, tapered channels (50a,b), generally extending across most of an adjacent side of the base plate, each channel having at least one open end (61);

a cover means (100) for protecting an air bag (150), the cover means includes a top (102) and side walls (106a, b), each side wall includes tapered wherein the base plate includes tabs locating means (114a,b) slidably received within the open end of and into a corresponding channel (50a,b), (72a,b) spaced from the channels defining in cooperation with a wall of the channel opposed slots in the base plate, the locating means of the cover means received within such slots.

4. The device as defined in claim 3 wherein the tapered locating means includes flanges (114a,b) on each side wall which fits into corresponding channels.

5. The device is defined in claim 4 wherein a first channel and a corresponding first flange includes one of a first retainer means and a second channel and a second flange includes a second retainer means providing an interlocking engagement therebetween.

6. An air bag module (20) comprising:

a mounting assembly (22) comprising a base plate (24), having first, second, third and fourth sides (40a–d) and a central opening (26), an integral first side plate extending upwardly from the first side of the base plate (24), the first side plate including:

a central portion a second side plate (42b) extending upwardly from the second side of the base plate (22) opposite from the first side plate (40a), a tapered varying height first channel (50) formed along the third side of the base plate (24), the first channel having an open cross-section having an open first end near the first side (40a) and an opposite open second end near the second side (40b) and an inward facing open side (58), a first tab (60) at the second end and a first retaining member (62) on a top surface (52), the height of the first channel increasing linearly from the first end toward the second end, a tapered, varying height second channel (50b) opposite the first channel (50a) formed along the fourth side (40d) of the base plate (24), the second channel having an open cross-section having an open third end near the first side (40a) and an open fourth end near the second side (40b) and an inward facing open side (58) at the third side (40c) and a second retaining members (62) on a top surface (52), the height of the second channel increasing linearly from the first end toward the second end (40b), a cover (100) having: a top (102) having tear seams (104) thereon defining a preferred region about which will rupture and open as an air bag (150) inflates, first and second side walls (106a,b) extending from the top (102), each side wall including first and second ends (116,118) and a bottom (112a,b), the bottoms (112a,b) including outwardly extending tapered, variable height, flanges (114a,b); each flange at a top surface including another retaining feature (130), third and fourth side walls (140a,b); extending from the top (102), the first and second flanges slidably received in the first and second channels with the another retaining features engaging the flanges in the first and second channels, the tabs (60a,b) bent over against ends of corresponding flanges to prevent the flanges from sliding out from the channels.

* * * * *